United States Patent
Cho et al.

(10) Patent No.: US 7,448,756 B2
(45) Date of Patent: Nov. 11, 2008

(54) SLIM OPTICAL PROJECTION SYSTEM AND IMAGE DISPLAY APPARATUS EMPLOYING THE SAME

(75) Inventors: Kun-ho Cho, Suwon-si (KR); Alexei Borodouline, Suwon-si (KR); Kirill Sokolov, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 387 days.

(21) Appl. No.: 11/231,885

(22) Filed: Sep. 22, 2005

(65) Prior Publication Data
US 2006/0066760 A1    Mar. 30, 2006

(30) Foreign Application Priority Data
Sep. 24, 2004    (KR) .................. 10-2004-0077374

(51) Int. Cl.
*G03B 21/28* (2006.01)
*H04N 3/23* (2006.01)

(52) U.S. Cl. .................. 353/37; 353/77; 353/70; 348/746

(58) Field of Classification Search .................. 353/37, 353/77, 78, 70, 98, 99, 119; 348/746, 788; *G03B 21/28; H04N 3/23*
See application file for complete search history.

(56) References Cited

U.S. PATENT DOCUMENTS

| | | | | |
|---|---|---|---|---|
| 5,274,406 A | * | 12/1993 | Tejima et al. | 353/70 |
| 5,625,495 A | * | 4/1997 | Moskovich | 359/663 |
| 5,692,820 A | * | 12/1997 | Gale et al. | 353/77 |
| 6,276,802 B1 | | 8/2001 | Naito | |
| 6,631,994 B2 | | 10/2003 | Suzuki et al. | |
| 2001/0050758 A1 | | 12/2001 | Suzuki et al. | |
| 2004/0032653 A1 | | 2/2004 | Gohman | |
| 2004/0156117 A1 | | 8/2004 | Takaura et al. | |
| 2004/0184009 A1 | * | 9/2004 | Hatakeyama et al. | 353/70 |
| 2004/0223123 A1 | * | 11/2004 | Engle et al. | 353/69 |
| 2005/0174545 A1 | | 8/2005 | Lee | |
| 2007/0035670 A1 | * | 2/2007 | Prior et al. | 348/745 |

FOREIGN PATENT DOCUMENTS

JP    09-138349    5/1997

(Continued)

OTHER PUBLICATIONS

European Search Report dated Jun. 12, 2006 issued in EP 05108540.

*Primary Examiner*—Andrew T Sever
(74) *Attorney, Agent, or Firm*—Stanzione & Kim, LLP

(57) ABSTRACT

A slim optical projection system and an image display apparatus employing the same. The optical projection system includes: a relay lens group to produce an intermediate image from an image created by a display and to generate a first distortion in the intermediate image, a projection lens group to enlarge and project the intermediate image that passes through the relay lens group and to generate a second distortion in the projected image, and a reflector to reflect the image enlarged by the projection lens group to a screen at a wide viewing angle. The first and second distortions are used to compensate for a third distortion caused by the reflector.

51 Claims, 6 Drawing Sheets

FOREIGN PATENT DOCUMENTS

| | | |
|---|---|---|
| JP | 11-326755 | 11/1999 |
| JP | 2000-250131 | 9/2000 |
| JP | 2003-57540 | 2/2003 |
| KR | 1998-75236 | 11/1998 |
| KR | 20-156536 | 6/1999 |
| KR | 2001-73004 | 7/2001 |
| KR | 2002-82958 A | 11/2002 |
| KR | 2003-10810 A | 2/2003 |
| WO | WO 98/08141 | 2/1998 |

\* cited by examiner

SLIM OPTICAL PROJECTION SYSTEM AND IMAGE DISPLAY APPARATUS EMPLOYING THE SAME

CROSS-REFERENCE TO RELATED APPLICATIONS

This application claims priority from Korean Patent Application No. 2004-77374, filed on Sep. 24, 2004, in the Korean Intellectual Property Office, the disclosure of which is incorporated herein in its entirety by reference.

BACKGROUND OF THE INVENTION

1. Field of the Invention

The present general inventive concept relates to a slim optical projection system and an image display apparatus employing the same, and more particularly, to a slim optical projection system that projects an image produced by a display onto a screen with a wide viewing angle and provides improved image quality by correcting distortions caused by the wide viewing angle projection and an image display apparatus employing the same.

2. Description of the Related Art

An image display apparatus includes a display that turns on and off a lamp-type light source to emit light for a plurality of pixels in order to create a color image and an optical projection system that enlarges and projects the color image onto a screen. Since the demand for image display apparatuses having large screens, a high resolution, and slim designs has increased, research has been actively conducted to satisfy this demand.

In order to achieve a slim image display apparatus, an optical projection system generates a bundle of light rays at a wide viewing angle. However, when the optical projection system is located at a center of the screen, the viewing angle of the bundle of projected light rays generated by the optical projection system can only be increased to a limited degree. FIG. 1 schematically illustrates a conventional image display apparatus. Referring to FIG. 1, in order to increase a viewing angle of a bundle of light rays generated by an optical projection system 20, the optical projection system 20 is disposed obliquely on a lower portion of a screen 40. An image produced by an optical engine 10 is enlarged and projected by the optical projection system 20 and is incident on a reflective mirror 30. The image reflected from the reflective mirror 30 is projected onto the screen 40.

When the image that emanates from the optical projection system 20 is reflected to the screen 40 by the reflective mirror 30 as described above, the image from the optical projection system 20 should be diffused at a very large angle, since a thickness of the image display apparatus is very small. However, a portion of the image that is projected at the wide angle by the optical projection system 20 disposed onto a lower portion of the screen 40 tends to undergo distortions, which can degrade an image quality. Thus, it is technically difficult to provide an image display apparatus with a large screen, a high image quality, and a slim design.

SUMMARY OF THE INVENTION

The present general inventive concept provides a slim optical projection system that projects an image at a wide viewing angle and provides improved image quality by correcting distortions caused by the wide viewing angle projection and an image display apparatus employing the same.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an optical projection system including: a relay lens group to produce an intermediate image from an image created by a display and to generate a first distortion in the intermediate image, a projection lens group to enlarge and project the intermediate image that passes through the relay lens group and to generate a second distortion in the projected image, and a reflector to reflect the image enlarged by the projection lens group to a screen at a wide viewing angle. The first and second distortions are used to compensate for a third distortion caused by the reflector.

The reflector may be an aspherical mirror and have a negative refractive power. The optical projection system may further include first and second optical path changers to change optical paths between the relay lens group and the projection lens group and between the projection lens group and the reflector, respectively. While an optical axis of the display can be coaxial with optical axes of the relay lens group and the projection lens group, an optical axis of the reflector is offset from the optical axis of the display. The first and second distortions may be spool distortions and the third distortion caused by the reflector may be a barrel distortion.

The foregoing and/or other aspects of the present general inventive concept may also be achieved by providing an optical projection system including: a refractive optical system to enlarge and transmit an image produced by a display, a reflective optical system to reflect the image transmitted by the refractive optical system at a wide viewing angle, and a relay lens group disposed between the display and the reflective optical system to preliminarily induce a first distortion to compensate for a third distortion caused by the reflective optical system. The refractive optical system may preliminarily induce a second distortion that is used in combination with the first distortion to compensate for the third distortion caused by the reflective optical system.

The foregoing and/or other aspects of the present general inventive concept may also be achieved by providing an image display apparatus including a display to receive a beam emitted by a light source and to produce an image by processing the received beam according to an input image signal and an optical projection system to enlarge and project the image onto a screen. The optical projection system includes: a relay lens group to produce an intermediate image from the image created by the display and to generate a first distortion in the intermediate image, a projection lens group to enlarge and project the intermediate image that passes through the relay lens group and to generate a second distortion in the projected image, and a reflector to reflect the image enlarged by the projection lens group to the screen at a wide viewing angle. The first and second distortions may be used to compensate for a third distortion caused by the reflector.

The optical projection system of the image displaying apparatus may include: a refractive optical system to enlarge and transmit an image produced by a display, a reflective optical system to reflect the image transmitted by the refractive optical system at a wide viewing angle, and a relay lens group disposed between the display and the reflective optical system to preliminarily induce a first distortion to compensate for a third distortion caused by the reflective optical system. The refractive optical system may preliminarily induce a second distortion that is used in combination with the first distortion to compensate for the third distortion caused by the reflective optical system.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
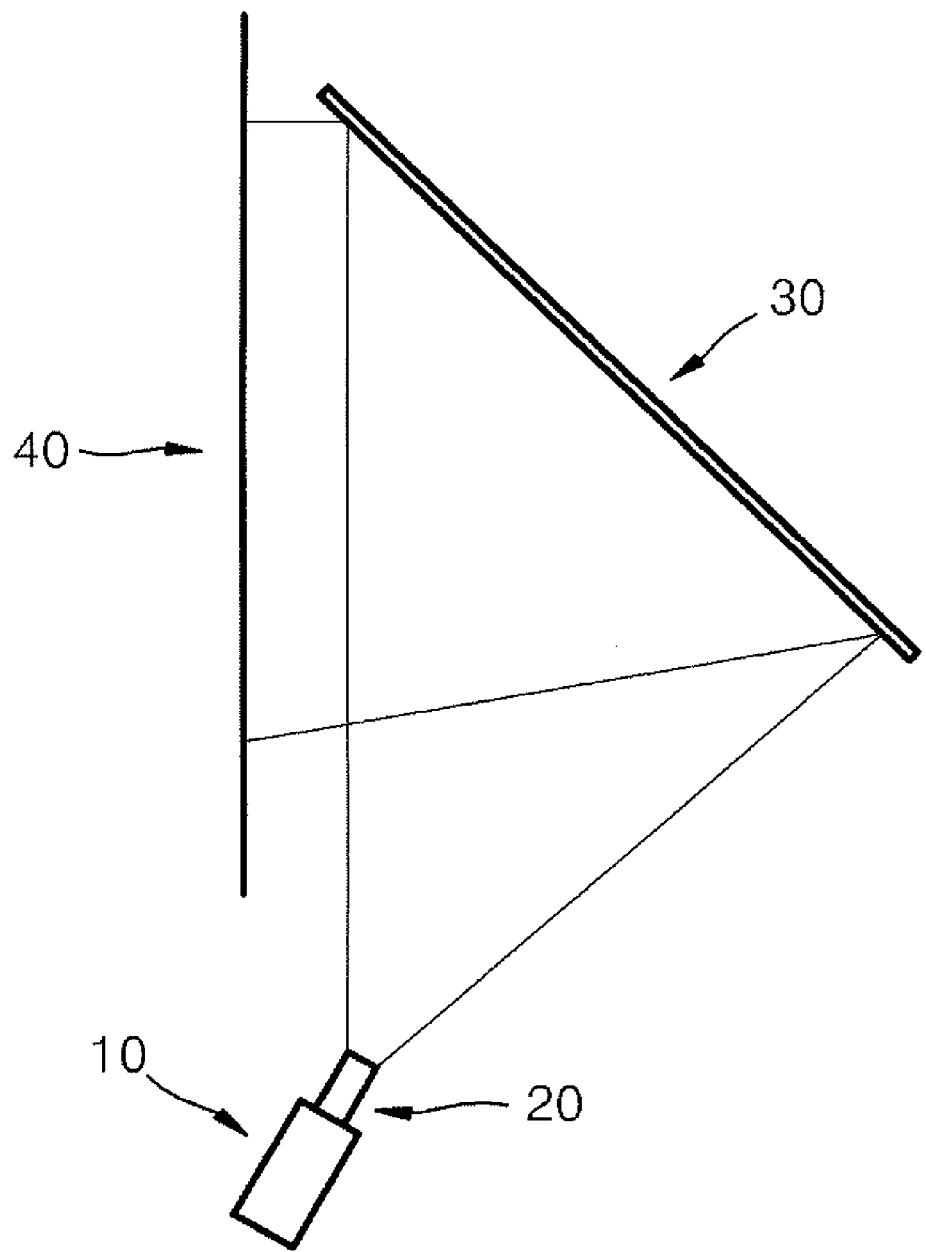
FIG. 1 schematically illustrates a conventional image display apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
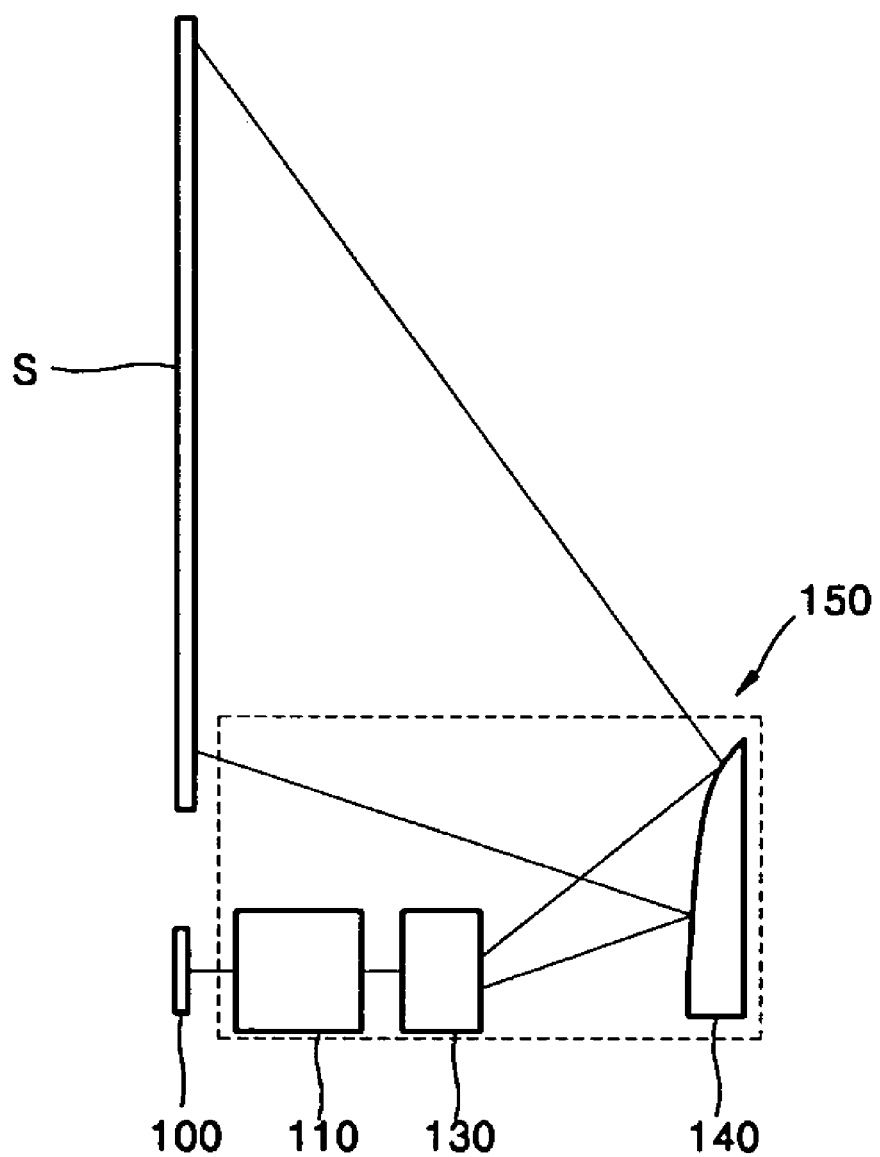
FIG. 2 schematically illustrates an image display apparatus according to an embodiment of the present general inventive concept.

Referring to FIG. 2, an image display apparatus includes an optical projection system 150 comprising a relay lens group 110 to produce an intermediate image from an image created by a display device 100, a projection lens group 130 to enlarge and project the intermediate image that passes through the relay lens group 110, and a reflector 140 to enlarge and reflect the image received from the projection lens group 130 onto a screen S.

The display device 100 produces an image by modulating a received beam according to image information received from an image information input (not shown). The display device 100 may be a digital micromirror device (DMD) display, a liquid crystal display (LCD), a grating light valve (GLV) display, or a liquid crystal on silicon (LCOS) display. The DMD display is a two-dimensional array of micromirrors that spatially modulate intensity of light incident thereon in order to produce an image.

Figure 3:
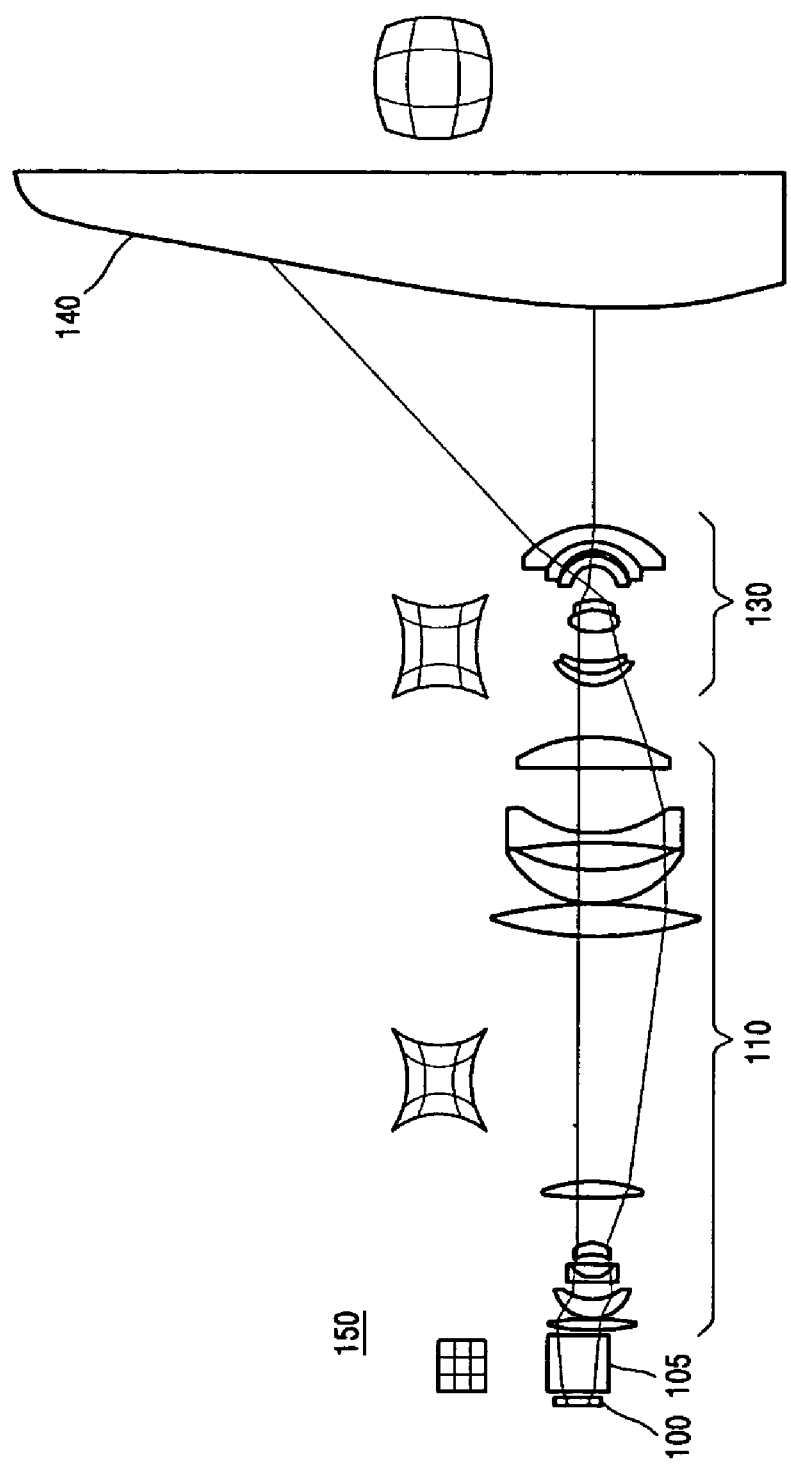
FIG. 3 illustrates an optical projection system according to an embodiment of the present general inventive concept.

FIG. 3 illustrates an arrangement of optical elements in the optical projection system 150 according to an embodiment of the present general inventive concept. Referring to FIG. 3, the optical projection system 150 includes a total reflection prism 105 that is disposed between the display device 100 and the relay lens group 110 and allows a beam to be incident on the display device 100 and reflects the image produced by the display device 100 to the relay lens group 110.

The projection lens group 130 enlarges and projects the intermediate image produced by the relay lens group 110 onto the reflector 140 that also enlarges and projects the image received from the projection lens group 130 onto the screen S. The reflector 140 may be a flat mirror or an aspherical mirror made of a reflective material, such as plastic having a negative refractive power to diffuse and enlarge the intermediate image received from the projection lens group 130. Since the projection lens group 130 and the reflector 140 both enlarge and projection the image, an ultra-wide viewing angle can be produced.

The relay lens group 110 includes at least one lens and produces the intermediate image from the image created by the display device 100 and generates a first distortion in the intermediate image to compensate for a third distortion caused by the reflector 140. The projection lens group 130 includes at least one lens and generates a second distortion in the intermediate image received from the relay lens group 110 that is used in combination with the first distortion to compensate for the third distortion caused by the reflector 140. That is, a predistortion is induced by the relay lens group 110 and the projection lens group 130 to offset a subsequent distortion caused by the reflector 140.

In the optical projection system of FIG. 3, optical axes of the relay lens group 110 and the projection lens group 130 are coaxial with an optical axis of the display device 100 while an optical axis of the reflector 140 is offset from the optical axis of the display device 100.

Referring to FIG. 3, when the reflector 140 causes a barrel distortion in the image, the relay lens group 110 and the projection lens group 130 produce spool distortions as the first and second distortions to correct the barrel distortion. Thus, the image reflected from the reflector 140 onto the screen S has a high visual quality with little distortion.

In order to achieve a wide viewing angle, the optical projection system 150 includes a refractive optical system, such as the projection lens group 130, and a reflective optical system, such as the reflector 140, and preliminarily induces the first and second distortions respectively generated by the relay lens group 110 and the projection lens group 130 in order to correct the third distortion caused by the reflective optical system.

By using the refractive and reflective optical systems efficiently, the optical projection system 150 can have a wide viewing angle, thereby minimizing a thickness of the image display apparatus.

In order to further reduce the thickness of the image display apparatus, the optical projection system 150 may further include at least one optical path-changer that is disposed in an optical path of light exiting the display device 100 to bend the optical path. The optical path changer may be a mirror member, reflector, a refractor, or a total reflection prism.

Figure 4:
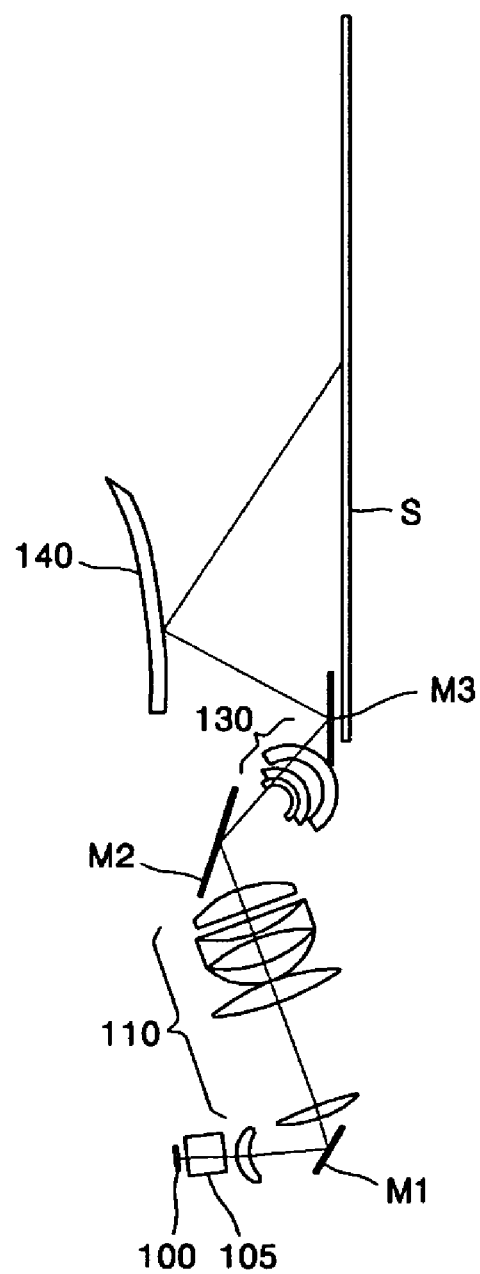
FIG. 4 illustrates an optical projection system according to another embodiment of the present general inventive concept.

FIG. 4 illustrates an optical projection system according to another embodiment of the present general inventive. As illustrated in FIG. 4, the optical projection system further includes a first optical path changer M1 disposed within the relay lens group 110, a second optical path changer M2 disposed between the relay lens group 110 and the projection lens group 130, and a third optical path changer M3 disposed between the projection lens group 130 and the reflector 140. Here, the first, second, and third optical path changers M1, M2, and M3 may be arranged in various manners according to structure and size of the image display apparatus as long as propagation of light is not inhibited.

Detailed design data of the optical projection system according to various embodiments of the present general inventive concept is as follows. It should be understood that this detailed design data is merely exemplary and is not intended to limit the scope of the present general inventive concept.

| | LENS RADIUS | THICKNESS OR DISTANCE | MATERIAL |
|---|---|---|---|
| OBJ: | INFINITY | 2.796436 | |
| STO: | INFINITY | 0.000000 | |
| 2: | INFINITY | 4.500000 | FC5_HOYA |
| 3: | INFINITY | 2.857478 | |
| 4: | INFINITY | 31.500000 | BSC7_HOYA |
| 5: | INFINITY | 3.750000 | |
| 6: | 138.75844 | 8.280000 | 530000.558000 |

ASP:
K: 0.000000 KC: 100
IC: YES CUF: 0.000000 CCF: 100
A: 0.370357E-05 B: 0.595265E-08 C: 0.622826E-11
D: -.963985E-14
AC: 0 BC: 0 CC: 0 DC: 0
XDE: 0.000000 YDE: -8.462589 ZDE: 0.000000
XDC: 100 YDC: 0 ZDC: 100
ADE: 0.000000 BDE: 0.000000 CDE: 0.000000
ADC: 100 BDC: 100 CDC: 100

| | | | |
|---|---|---|---|
| 7: | -66.68653 | 0.250000 | |

ASP:
K: 0.000000 KC: 100
IC: YES CUF: 0.000000 CCF: 100
A: 0.250570E-05 B: 0.233156E-07 C: -.299779E-10
D: 0.100220E-13
AC: 0 BC: 0 CC: 0 DC: 0

| | | | |
|---|---|---|---|
| 8: | 25.92585 | 9.050000 | 585000.300000 |

ASP:
K: 0.000000 KC: 100
IC: YES CUF: 0.000000 CCF: 100
A: -.809231E-05 B: 0.394152E-07 C: -.418399E-10
D: 0.365897E-13
AC: 0 BC: 0 CC: 0 DC: 0

| | | | |
|---|---|---|---|
| 9: | 34.01128 | 16.693085 | |

ASP:
K: 0.000000 KC: 100
IC: YES CUF: 0.000000 CCF: 100
A: -.678826E-05 B: 0.348919E-07 C: 0.492448E-10
D: -.655992E-13
AC: 0 BC: 0 CC: 0 DC: 0

| | | | |
|---|---|---|---|
| 10: | 148.22470 | 3.000000 | FD60_HOYA |
| 11: | 21.70852 | 8.460000 | BACD16_HOYA |
| 12: | -74.30484 | 0.931819 | |
| 13: | INFINITY | 5.347270 | |
| 14: | -20.84671 | 6.560000 | FDS90_HOYA |
| 15: | -25.42430 | 39.432636 | |
| 16: | 88.74154 | 9.500000 | BACD16_HOYA |
| 17: | 226.38703 | 130.338902 | |
| 18: | 245.86016 | 14.350000 | NBFD11_HOYA |
| 19: | -284.65876 | 3.292052 | |
| 20: | 58.51450 | 20.595944 | NBFD11_HOYA |
| 21: | 117.70609 | 21.122648 | |
| 22: | -117.72384 | 7.000000 | FD60_HOYA |
| 23: | 106.58194 | 17.234922 | |
| 24: | 1530.78719 | 18.740000 | FD60_HOYA |
| 25: | -80.72770 | 45.384350 | |
| 26: | 21.35497 | 5.000676 | 492000.572000 |

SLB: "a31"(lable)
ASP:
K: 0.000000 KC: 100
IC: YES CUF: 0.000000 CCF: 100
A: -.442430E-04 B: -.621669E-07 C: 0.379227E-09
D: -.573845E-12
AC: 0 BC: 0 CC: 0 DC: 0

| | | | |
|---|---|---|---|
| 27: | 24.92272 | 0.263109 | |

SLB: "a32"
ASP:
K: 0.000000 KC: 100
IC: YES CUF: 0.000000 CCF: 100
A: -.290067E-04 B: 0.520341E-07 C: 0.138136E-09
D: -.150310E-12
AC: 0 BC: 0 CC: 0 DC: 0

| | | | |
|---|---|---|---|
| 28: | 25.57319 | 17.990480 | BACD16_HOYA |
| 29: | 26.92306 | 1.340263 | |
| 30: | 19.25781 | 13.924676 | BACD16_HOYA |
| 31: | -17.81165 | 5.070000 | FDS9_HOYA |
| 32: | -42.17431 | 23.521612 | |
| 33: | -23.57450 | 6.000000 | 492000.572000 |

-continued

| | LENS RADIUS | THICKNESS OR DISTANCE | MATERIAL |
|---|---|---|---|

SLB: "a51"(lable)
ASP:
K: 0.000000 KC: 100
IC: YES CUF: 0.000000 CCF: 100
A: -.146704E-03 B: -.485660E-06 C: 0.260530E-08
D: -.119990E-10
AC: 0 BC: 0 CC: 0 DC: 0

| | | | |
|---|---|---|---|
| 34: | 131.24572 | 2.842091 | |

SLB: "a52"(lable)
ASP:
K: 0.000000 KC: 100
IC: YES CUF: 0.000000 CCF: 100
A: -.840961E-04 B: 0.783544E-07 C: -.129601E-09
D: -.932680E-16
AC: 0 BC: 0 CC: 0 DC: 0

| | | | |
|---|---|---|---|
| 35: | -23.85229 | 5.130000 | NBFD15_HOYA |
| 36: | -37.12781 | 5.464499 | |
| 37: | -35.05967 | 8.000000 | 492000.572000 |

SLB: "a61"(lable)
ASP:
K: 0.000000 KC: 100
IC: YES CUF: 0.000000 CCF: 100
A: 0.234861E-04 B: -.617487E-07 C: 0.481096E-10
D: -.130429E-13
AC: 0 BC: 0 CC: 0 DC: 0

| | | | |
|---|---|---|---|
| 38: | -90.20913 | 99.950000 | |

SLB: "l"(lable)
ASP:
K: 0.000000 KC: 100
IC: YES CUF: 0.000000 CCF: 100
A: -.982918E-05 B: 0.444483E-08 C: -.494745E-11
D: 0.946184E-15
AC: 0 BC: 0 CC: 0 DC: 0

| | | | |
|---|---|---|---|
| 39: | INFINITY | -97.400000 | REFL |

SLB: "m"(lable)
SPS XYP:
IC: YES
SCO/SCC
X2: 1.7502E-03 Y2: 1.7342E-03 X2Y: -4.6569E-06
SCC C4: 0 SCC C6: 0 SCC C8: 0
Y3: -6.2731E-06 X4: -2.7828E-08 X2Y2: -5.4611E-08
SCC C10: 0 SCC C11: 0 SCC C13: 0
Y4: -3.3816E-09 X4Y: 1.2384E-10 X2Y3: 2.3422E-10
SCC C15: 0 SCC C17: 0 SCC C19: 0
Y5: 2.3965E-11 X6: 2.4256E-14 X4Y2: 3.8056E-13
SCC C21: 0 SCC C22: 0 SCC C24: 0
X2Y4: 3.5202E-13 Y6: 9.6308E-14 X6Y: 2.3936E-16
SCC C26: 0 SCC C28: 0 SCC C30: 0
X4Y3: 3.2006E-16 X2Y5: -1.1911E-15 Y7: 1.0423E-16
SCC C32: 0 SCC C34: 0 SCC C36: 0
X8: 1.2656E-17 X6Y2: 1.0115E-18 X4Y4: -1.9730E-17
SCC C37: 0 SCC C39: 0 SCC C41: 0
X2Y6: -8.6550E-18 Y8: -7.1187E-19 X8Y: -8.4031E-20
SCC C43: 0 SCC C45: 0 SCC C47: 0
X6Y3: -2.2846E-20 X4Y5: -4.5095E-21 X2Y7: 2.3931E-20
SCC C49: 0 SCC C51: 0 SCC C53: 0
Y9: -4.1720E-21 X10: -1.6329E-22 X8Y2: 2.5535E-22
SCC C55: 0 SCC C56: 0 SCC C58: 0
X6Y4: 6.0420E-24 X4Y6: 2.5305E-22 X2Y8: -2.9495E-23
SCC C60: 0 SCC C62: 0 SCC C64: 0
Y10: 5.6877E-24 BDX: 3.5000E+02 BDY: 3.0000E+02
SCC C66: 0 SCC C82: SCC C83:
BDZ: 3.0000E+02
SCC C84:
XDE: 0.000000 YDE: 29.882489 ZDE: 0.000000 DAR
XDC: 100 YDC: 0 ZDC: 100
ADE: -6.924326 BDE: 0.000000 CDE: 0.000000
ADC: 0 BDC: 100 CDC: 100

| | | | |
|---|---|---|---|
| 40: | INFINITY | 152.000000 | REFL |

SLB: "g2"(lable)

| | | | |
|---|---|---|---|
| 41: | INFINITY | 0.000000 | |
| 42: | INFINITY | 0.000000 | |

XDE: 0.000000 YDE: 636.488356 ZDE: 0.000000
XDC: 100 YDC: 0 ZDC: 100

-continued

| | LENS | |
|---|---|---|
| RADIUS | THICKNESS OR DISTANCE | MATERIAL |

ADE: 0.000000 BDE: 0.000000 CDE: 0.000000
ADC: 100 BDC: 100 CDC: 100
IMG: INFINITY 0.000000

Specification Data

| NAO | 0.20000 | | | | |
|---|---|---|---|---|---|
| DIM | MM | | | | |
| WL | 632.80 | 546.07 | 460.00 | | |
| REF | 2 | | | | |
| WTW | 1 | 1 | 1 | | |
| XOB | 0.00000 | 8.86000 | 4.43000 | 8.86000 | 4.43000 |
| | 0.00000 | 6.64000 | 4.43000 | 8.86000 | 0.00000 |
| | 6.64000 | | | | |
| YOB | 0.00000 | 0.00000 | 0.00000 | −4.98000 | −4.98000 |
| | −4.98000 | −3.32000 | 4.98000 | 4.98000 | 4.98000 |
| | 3.32000 | | | | |
| WTF | 1.00000 | 1.00000 | 1.00000 | 1.00000 | 1.00000 |
| | 100.00000 | 1.00000 | 1.00000 | 1.00000 | 1.00000 |
| | 1.00000 | | | | |
| VUX | 0.00000 | 0.00000 | 0.00000 | 0.00000 | 0.00000 |
| | 0.00000 | 0.00000 | 0.00000 | 0.00000 | 0.00000 |
| | 0.00000 | | | | |
| VLX | 0.00000 | 0.00000 | 0.00000 | 0.00000 | 0.00000 |
| | 0.00000 | 0.00000 | 0.00000 | 0.00000 | 0.00000 |
| | 0.00000 | | | | |
| VUY | 0.00000 | 0.00000 | 0.00000 | 0.00000 | 0.00000 |
| | 0.00000 | 0.00000 | 0.00000 | 0.00000 | 0.00000 |
| | 0.00000 | | | | |
| VLY | 0.00000 | 0.00000 | 0.00000 | 0.00000 | 0.00000 |
| | 0.00000 | 0.00000 | 0.00000 | 0.00000 | 0.00000 |
| | 0.00000 | | | | |

Aperature Data/Edge Definitions
CA
Aperture data not specified for surface Obj thru 43
Refractive Indices

| GLASS CODE | 632.80 | 546.07 | 460.00 |
|---|---|---|---|
| FC5_HOYA | 1.486014 | 1.489142 | 1.494026 |
| BSC7_HOYA | 1.515086 | 1.518719 | 1.524422 |
| FDS9_HOYA | 1.839565 | 1.855036 | 1.882227 |
| FDS90_HOYA | 1.839557 | 1.855048 | 1.882330 |
| BACD16_HOYA | 1.618237 | 1.622862 | 1.630197 |
| FD60_HOYA | 1.798849 | 1.812631 | 1.836802 |
| NBFD15_HOYA | 1.801166 | 1.811837 | 1.829942 |
| 492000.572000 | 1.490193 | 1.494050 | 1.500226 |
| 492000.572000 | 1.490193 | 1.494050 | 1.500226 |
| 492000.572000 | 1.490193 | 1.494050 | 1.500226 |
| NBFD11_HOYA | 1.782176 | 1.790150 | 1.803176 |
| 585000.300000 | 1.581055 | 1.589610 | 1.604296 |
| 530000.558000 | 1.528009 | 1.532263 | 1.539099 |

Infinite Conjugates

| EFL | −8.0684 |
|---|---|
| BFL | −379.4730 |
| FFL | −2.5970 |
| FNO | 0.0000 |

At Used Conjugates

| RED | −40.4490 |
|---|---|
| FNO | −101.1224 |

-continued

| OBJ DIS | 2.7964 |
|---|---|
| TT | 675.5649 |
| IMG DIS | 0.0000 |
| OAL | 672.7685 |

Paraxial Image

| HT | 134.2905 |
|---|---|
| THI | −53.1149 |
| ANG | 0.0000 |

Entrance Pupil

| DIA | 0.4082E+10 |
|---|---|
| THI | 0.1000E+11 |

Exit Pupil

| DIA | 3.2939 |
|---|---|
| THI | −379.4730 |

Figure 5:
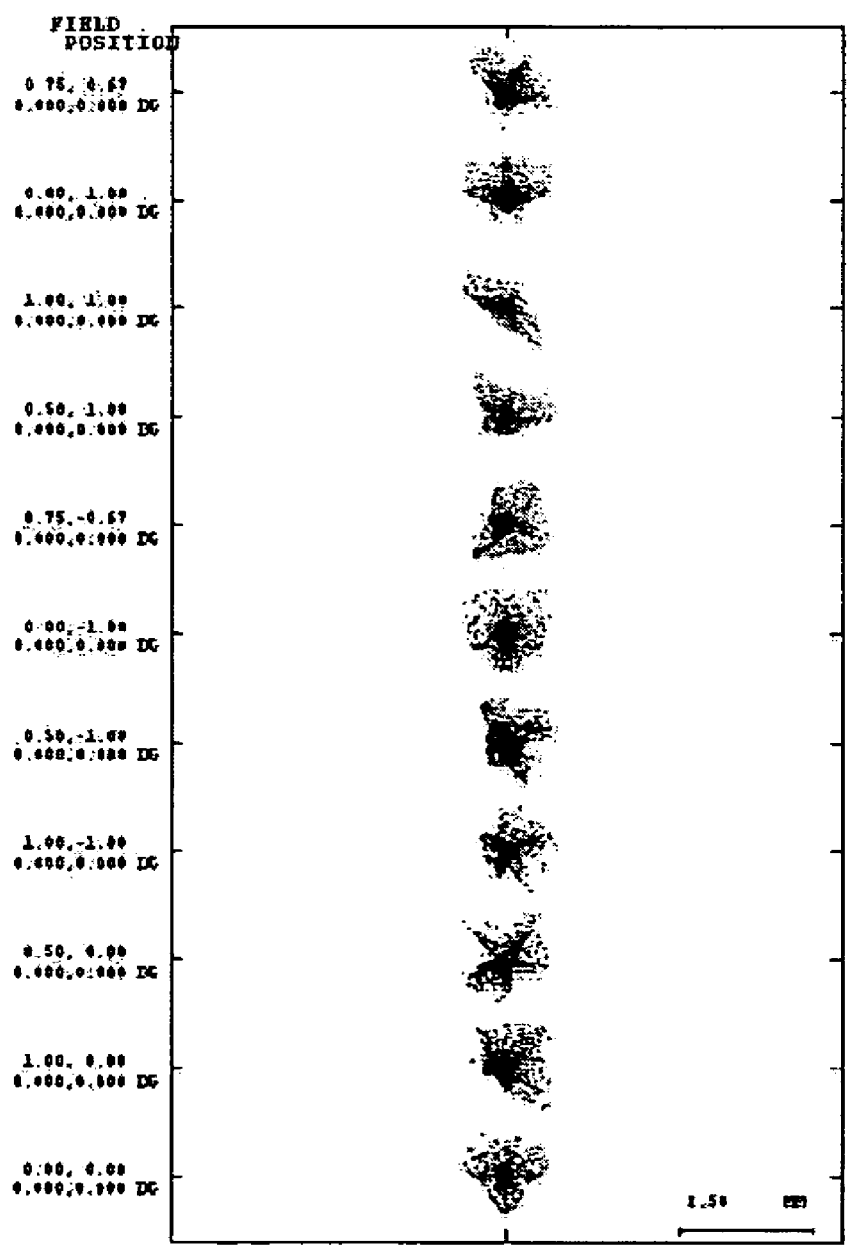
FIG. 5 illustrates a distribution of light spots for each field position exhibited by an image display apparatus according to an embodiment of the present general inventive concept.
Figure 6:
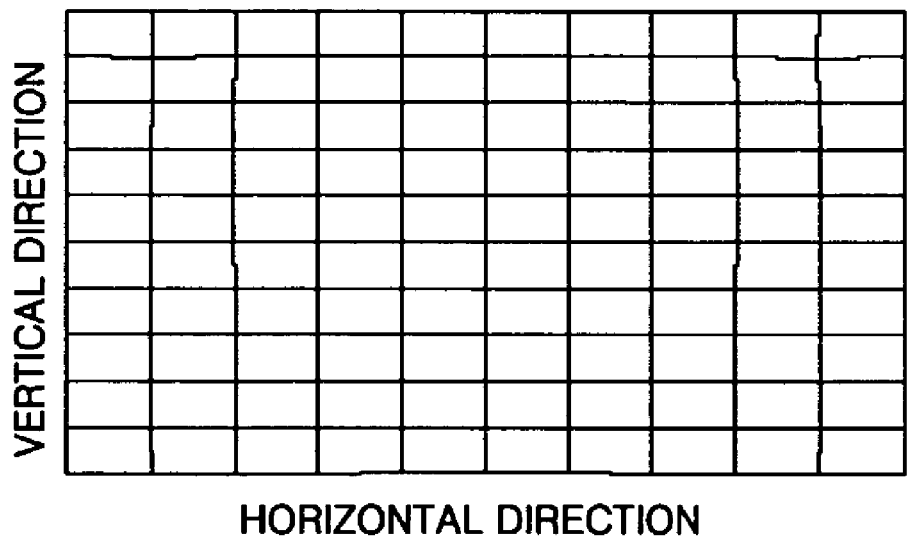
FIG. 6 illustrates distortions of an image exhibited by an image display apparatus according to an embodiment of the present general inventive concept.

FIGS. 5 and 6 respectively illustrate a distribution of light spots for each field position and image distortions exhibited by an image display apparatus according to an embodiment of the present general inventive concept. As illustrated in FIG. 6, the image display apparatus according to various embodiments of the present general inventive concept exhibits good image quality. The present general inventive concept uses refractive and reflective optical systems to efficiently achieve a wide viewing angle, thereby providing the image display apparatus with a reduced thickness compared to a thickness of a conventional image display apparatus when a screen size remains constant.

As described above, an optical projection system and an image display apparatus according to the present general inventive concept includes refractive and reflective optical systems to project an image produced by a display onto a screen with a wide viewing angle, thereby reducing a thickness of the image display apparatus. The optical projection system and the image display apparatus also induce predistortions through a relay lens group and/or the refractive optical system to compensate for distortion caused by the reflective optical system, thereby providing high quality images.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An optical projection system, comprising:
   a relay lens group to produce an intermediate image from an image created by a display and to generate a first spool distortion in the intermediate image;
   a projection lens group to enlarge and project the intermediate image that passes through the relay lens group and to generate a second spool distortion in the projected image, the second spool distortion being different from the first spool distortion; and a reflector to reflect the image enlarged by the projection lens group onto a screen at a wide viewing angle, wherein the first and second spool distortions compensate for a third distortion caused by the reflector.

2. The optical projection system of claim 1, wherein the reflector comprises an aspherical mirror.

3. The optical projection system of claim 1, wherein the reflector has a negative refractive power.

4. The optical projection system of claim 1, further comprising:

first and second optical path changers to change optical paths between the relay lens group and the projection lens group and between the projection lens group and the reflector, respectively.

5. The optical projection system of claim 4, further comprising:

a third optical path changer disposed within the relay lens group.

6. The optical projection system of claim 4, wherein the first, second, and third optical path changers comprise one of a mirror and a total reflection prism.

7. The optical projection system of claim 1, wherein an optical axis of the display is coaxial with optical axes of the relay lens group and the projection lens group.

8. The optical projection system of claim 7, wherein an optical axis of the reflector is offset from the optical axis of the display.

9. The optical projection system of claim 1, wherein the third distortion caused by the reflector is a barrel distortion.

10. The optical projection system of claim 1, wherein the reflector enlarges the image enlarged by the projection lens group.

11. An optical projection system usable with an image display apparatus, comprising:

a preliminary distortion unit to receive an image created by an image creation unit and to induce a preliminary spool distortion in the received image; and an image enlarging unit to receive the preliminary distorted image, to enlarge the received image while inducing a spool distortion in the received image, and to project the enlarged image onto a screen, the spool distortion being different from the preliminary spool distortion, wherein the preliminary spool distortion compensates for the spool distortion induced by the image enlarging unit, and wherein the image enlarging unit compensates for a subsequent distortion.

12. The optical projection system of claim 11, wherein the preliminary distortion unit comprises at least one of a relay lens group, a projection lens group, and a refractive optical system.

13. The optical projection system of claim 12, wherein the image enlarging unit comprises a reflective optical system.

14. The optical projection system of claim 11, wherein the preliminary distortion unit receives the created image in an opposite direction from the screen and provides the preliminary distorted image toward a rear direction of the image display apparatus, and the image enlarging unit reflects the enlarged image back toward a forward direction of the image display apparatus onto the screen.

15. The optical projection system of claim 11, wherein the distortion comprises barrel distortion.

16. The optical projection system of claim 11, wherein the preliminary distortion unit comprises:

a relay lens group to produce an intermediate image from the image created by the image creation unit and to generate a first distortion in the intermediate image; and a projection lens group to enlarge and project the intermediate image that passes through the relay lens group to the image enlarging unit and to generate a second distortion in the projected image.

17. The optical projection system of claim 16, wherein the image enlarging unit comprises a reflector to reflect the image enlarged by the projection lens group onto the screen at a wide viewing angle such that the first and second distortions generated in the image compensate for distortion generated when the image is reflected at the wide viewing angle onto the screen.

18. An optical projection system, comprising:

a refractive optical system to enlarge and transmit an image produced by a display;

a reflective optical system to reflect the image transmitted by the refractive optical system at a wide viewing angle; and a relay lens group disposed between the display and the reflective optical system to preliminarily induce a first spool distortion to compensate for a third distortion caused by the reflective optical system, wherein the refractive optical system preliminarily induces a second spool distortion that is used in combination with the first spool distortion to compensate for the third distortion caused by the reflective optical system, the second spool distortion being different from the first spool distortion.

19. The optical projection system of claim 18, wherein the reflective optical system comprises an aspherical mirror.

20. The optical projection system of claim 18, wherein the reflective optical system has a negative refractive power.

21. The optical projection system of claim 18, further comprising:

first and second optical path changers to change optical paths between the relay lens group and the refractive optical system and between the refractive optical system and the reflective optical system, respectively.

22. The optical projection system of claim 21, further comprising:

a third optical path changer disposed within the relay lens group.

23. The optical projection system of claim 21, wherein the first, second, and third optical path changers comprise one of a mirror and a total reflection prism.

24. The optical projection system of claim 18, wherein an optical axis of the display is coaxial with optical axes of the relay lens group and the refractive optical system.

25. The optical projection system of claim 24, wherein an optical axis of the reflective optical system is offset from the optical axis of the display.

26. The optical projection system of claim 18, wherein the first and second distortions are spool distortions, and the third distortion caused by the reflective optical system is a barrel distortion.

27. The optical projection system of claim 18, wherein the reflective optical system enlarges the image transmitted by the refractive optical system.

28. An image display apparatus including a display to receive a beam emitted by a light source and to produce an image by processing the received beam according to an input image signal and an optical projection system to enlarge and project the produced image onto a screen, and the optical projection system comprises:

a relay lens group to produce an intermediate image from the image created by the display and to generate a first spool distortion in the intermediate image;

a projection lens group to enlarge and project the intermediate image that passes through the relay lens group and to generate a second spool distortion in the projected image, the second spool distortion being different from the first spool distortion; and a reflector to reflect the image enlarged by the projection lens group onto the screen at a wide viewing angle, wherein the first and second spool distortions are used to compensate for a third distortion caused by the reflector.

29. The apparatus of claim 28, wherein the reflector comprises an aspherical mirror.

30. The apparatus of claim 28, wherein the reflector has a negative refractive power.

31. The apparatus of claim 28, wherein the optical projection system further comprises first and second optical path changers to change optical paths between the relay lens group and the projection lens group and between the projection lens group and the reflector, respectively.

32. The apparatus of claim 31, wherein the optical projection system further comprises a third optical path changer disposed within the relay lens group.

33. The apparatus of claim 31, wherein the first, second, and third optical path changers comprise one of a mirror and a total reflection prism.

34. The apparatus of claim 28, wherein an optical axis of the display is coaxial with optical axes of the relay lens group and the projection lens group.

35. The apparatus of claim 34, wherein an optical axis of the reflector is offset from the optical axis of the display.

36. The apparatus of claim 28, wherein the first and second distortions are spool distortions, and the third distortion caused by the reflector is a barrel distortion.

37. The apparatus claim of 28, wherein the reflector enlarges the image enlarged by the projection lens group.

38. An image display apparatus including a display to receive a beam emitted by a light source and to produce an image by processing the received beam according to an input image signal and an optical projection system to enlarge and project the produced image onto a screen, and the optical projection system comprises:

a refractive optical system to enlarge and transmit the image produced by the display;

a reflective optical system to reflect the image transmitted by the refractive optical system at a wide viewing angle; and a relay lens group disposed between the display and the reflective optical system to preliminarily induce a first spool distortion to compensate for a third distortion caused by the reflective optical system, wherein the refractive optical system preliminarily induces a second spool distortion that is used in combination with the first spool distortion to compensate for the third distortion caused by the reflective optical system, the second spool distortion being different from the first spool distortion.

39. The apparatus of claim 38, wherein the reflective optical system comprises an aspherical mirror.

40. The apparatus of claim 38, wherein the reflective optical system has a negative refractive power.

41. The apparatus of claim 38, wherein the optical projection system further comprises first and second optical path changers to change optical paths between the relay lens group and the refractive optical system and between the refractive optical system and the reflective optical system, respectively.

42. The apparatus claim of 38, wherein the optical system enlarges the image transmitted by the refractive optical system.

43. An image display apparatus to display an image on a screen, comprising:

an image creation unit to create an image; and an optical projection system, comprising:

a preliminary distortion unit to receive the image created by an image creation unit and to induce a preliminary spool distortion in the received image; and an image enlarging unit to receive the preliminary spool distorted image, to enlarge the received image while inducing a spool distortion in the received image, and to project the enlarged image onto a screen, the spool distortion being different from the preliminary spool distortion, wherein the preliminary spool distortion compensates for the spool distortion induced by the image enlarging unit, and wherein the image enlarging unit compensates for a subsequent distortion.

44. An optical projection system, comprising:

a display to generate an image;

a first lens group to generate a first intermediate image having a first spool distortion from the image;

a second lens group to generate a second intermediate image having a second spool distortion from the first intermediate image, the second spool distortion being different from the first spool distortion;

a reflector to introduce a third distortion into the second intermediate image to compensate for the first and second spool distortions, and to generate a third intermediate image; and a screen to display the third intermediate image without the first and second spool distortions.

45. The system of claim 44, wherein the first and second intermediate images have a pincushion shape, and the reflector generates the third intermediate image to have a rectangular shape by introducing the third distortion having a barrel shape.

46. The system of claim 44, wherein the third intermediate image is enlarged from the second intermediate image.

47. The apparatus claim of 44, wherein the second intermediate image is enlarged from the first intermediate image.

48. An image display apparatus, comprising:

a screen disposed at a front side of the image display apparatus;

an imager creator disposed under the screen at the front side of the image display apparatus to create an image having a plurality of light beams and to transmit the plurality of light beams in a rear direction;

a refractive optical system to receive the plurality of light beams from the image creator and to relay the plurality of light beams along the rear direction while enlarging an angle along which the plurality of light beams propagates and while introducing a predetermined spool distortion in the image; and a reflective optical system disposed at a rear side of the image display apparatus to receive the plurality of light beams from the refractive optical system and to reflect the plurality of light beams onto the screen while enlarging the image and introducing another spool distortion in the image, the another spool distortion being different from the predetermined spool distortion, wherein the predetermined spool distortion and the another spool distortion cancel out each other.

49. A method of forming an image in an optical projection system, the method comprising:

receiving an image created by an image creation unit;

relaying and enlarging the received image to a reflector while creating a spool predistortion in the received image and providing the predistorted image to a reflector; and reflecting and enlarging the predistorted image toward a screen while introducing a spool distortion that is compensated for by the predistortion, the spool distortion being different from the spool predistortion.

50. The method of claim 49, wherein the predistoration comprises one or more spool distortions and the distortion comprises a barrel distortion.

51. The method of claim 49, wherein:

creating the predistortion in the received image comprises performing a first enlarging operation using a projection lens group; and reflecting of the predistorted image toward the screen comprises performing a second enlarging operation using the reflector.

* * * * *